United States Patent [19]

Murcott et al.

[11] Patent Number: 5,543,056
[45] Date of Patent: Aug. 6, 1996

[54] METHOD OF DRINKING WATER TREATMENT WITH NATURAL CATIONIC POLYMERS

[75] Inventors: Susan E. Murcott, Marblehead; Donald R. F. Harleman, Cambridge, both of Mass.

[73] Assignee: Massachusetts Institute of Technology, Cambridge, Mass.

[21] Appl. No.: 268,266

[22] Filed: Jun. 29, 1994

[51] Int. Cl.$^6$ ........................................... C02F 1/56
[52] U.S. Cl. .................. 210/705; 210/728; 210/730; 210/731; 210/917
[58] Field of Search .................... 210/705, 725, 210/714, 727, 728, 730, 731, 917

[56] References Cited

U.S. PATENT DOCUMENTS

| | | | |
|---|---|---|---|
| 3,338,828 | 8/1967 | Clark | 210/731 |
| 3,533,940 | 10/1970 | Peniston et al. | |
| 3,842,005 | 10/1974 | Moser et al. | 210/731 |
| 3,862,122 | 1/1975 | Peniston et al. | |
| 4,018,678 | 4/1977 | Peniston et al. | |
| 4,053,401 | 10/1977 | Fukushima et al. | |
| 4,195,175 | 3/1980 | Peniston et al. | |
| 4,765,908 | 8/1988 | Monick et al. | |
| 5,071,512 | 12/1991 | Bixler et al. | |
| 5,178,730 | 1/1993 | Bixler et al. | |
| 5,204,452 | 4/1993 | Dingilian et al. | 530/420 |
| 5,269,939 | 12/1993 | Laurent et al. | 210/705 |
| 5,393,435 | 2/1995 | Deans et al. | 210/730 |

FOREIGN PATENT DOCUMENTS

| | | |
|---|---|---|
| 49-28115 | 7/1974 | Japan . |
| 52-111893 | 9/1977 | Japan . |

OTHER PUBLICATIONS

"Jar Test of the Natural Polymer Chitosan", *The American Water Works Association Water Quality Technology Conference Proceedings* (presented Nov. 1993).

"MIT Jar Test of the Wachusett Reservoir Water Using the Natural Polymer Chitosan with Bentonite", Murcott (Jul. 1993).

Susumu Kawamura, "*Effectiveness of Natural Polyelectrolytes in Water Treatment*", Journal AWWA, pp. 88–91, Oct. 1991.

Elizabeth A. Thomson, "*Shellfish May Play Role in Sewage Treatment*", MIT Tech Talk, Oct. 28, 1992.

"*Shellfish May Help Treat Sewage*", Civil Engineering News, vol. 4, No. 11, Dec. 1992.

"*Some Shellfish With Your Sewage*", Civil Engineering News.

Elizabeth Pennisi, "*Chitin Craze*", Science News, vol. 144, pp. 72–73, Jul. 13, 1993.

*Primary Examiner*—Peter A. Hruskoci
*Attorney, Agent, or Firm*—Choate, Hall & Stewart

[57] ABSTRACT

A method for treating water using natural polymers that provide an alternate and improved means to achieve enhanced coagulation is described. A method for removing particles, color, and color from drinking water, comprising adding a primary coagulant such as a natural, cationic polymer like chitosan or a cationic starch and a coagulant aid such as bentonite to drinking water to form a mixture. A preferred concentration weight ratio of natural polymer to clay mineral is between 1:5 and 1:20.

A composition for removing particles and color from drinking water is described that includes a natural, cationic polymer coagulant and clay mineral in a total amount effective to coagulate suspended material in the drinking water. The composition includes a weight ratio natural polymer coagulant/clay mineral of between about 1:5 to about 1:20.

9 Claims, 4 Drawing Sheets

FIG. 8

METHOD OF DRINKING WATER TREATMENT WITH NATURAL CATIONIC POLYMERS

The work described herein was funded, in part, by MIT Sea Grant Number NA 90AA-D-SG424. The Government has certain rights in the invention.

BACKGROUND OF THE INVENTION

New rules proposed by the Environmental Protection Agency under the Safe Drinking Water Act are leading drinking water treatment professionals to re-evaluate present treatment capabilities and evaluate alternatives for the future. Depending on the size of the facility, water utilities using surface water as their source for drinking water will need to monitor a wider array of contaminants in the drinking water than heretofore. Monitoring results will lead to a determination as to whether enhanced surface water treatment is required to further protect end-users from microbial contaminants and disinfectant/disinfection by-products.

If higher-order drinking water treatment is needed, enhanced coagulation would be required. Chemical coagulants used in water treatment include inorganic coagulants and organic polymers. Inorganic coagulants include conventional metal salts (e.g. aluminum sulfate $Al_2(SO_4)_3$; ferric chloride ($FeCl_3$); lime ($CaCO_3$) and polymerized metal salts (e.g. polyaluminum chloride p-$AlCl_3$) or polyaluminum silicate sulfate (p-AlSiS).

However, higher doses of chemical coagulants have drawbacks as well. The benefits and proven efficacy of aluminum sulfate, the most widely used coagulant in drinking water treatment, is offset by the problem of residual metal contamination contributed by the metal salt and by performance problems at low temperatures. Higher doses of metal salts will generate large quantities of sludge and will depress pH, thereby requiting additional doses of pH adjustment chemicals. Use of synthetic organic polymer coagulants such as polyacrylamides and polyamines are also problematic since they may be toxic under certain circumstances.

These concerns have led to a ban on the use of many synthetic polymers in drinking water treatment in Germany, (Jackson, 1992, P. 1992. New Draft European Standards for Drinking Water Treatment Chemicals, paper delivered at the Intertech Conference: Flocculants, Coagulants and Precipitants for Drinking and Wastewater Treatment. Oct. 29–30, 1992. Herndon, Va.), in the Netherlands (Jackson, 1992, id.), and in Japan (Aizawa, T. et. al. 1990, Problems with Introducing Synthetic Polyelectrolyte Coagulants into the Water Purification Process, *Water Supply* Vol 8. Jonkoping, pp 27–35.). Elsewhere, doses of synthetic polymer coagulants are regulated to control potential problems with impurities (National Sanitation Foundation, 1988. Drinking Water Treatment Chemicals—Health Effects. Ann Arbor, Mich. ANSI/NSF60).

Attempts have been made to employ natural polymeric materials as coagulants in removal of greases, fats, and oils from industrial wastewater. Laurent (U.S. Pat. No. 5,269, 939) describes a method for recovering suspended fats, oils, greases, proteins, and minerals from animal and/or food processing industrial wastewater streams using chitosan and clay. The wastewater freed of these materials is intended for discharge to municipal sewage treatment plants and the recovered solid material is a potential animal feed or fuel source. His method is "applicable to waste streams having any combination of fats, oils, greases, minerals, and/or proteins." (U.S. Pat. No. 5,269,939). There is a need to employ natural polymer coagulants and coagulant aids in other treatment contexts (i.e. drinking water treatment) in order to remove different sets of contaminants (i.e. particles, measured as turbidity or as number of particles; color; disinfectant/disinfection by-products).

SUMMARY OF THE INVENTION

The present invention is a method for treating drinking water using natural polymers that provide an alternate and improved means to achieve enhanced coagulation.

A preferred embodiment is a method of treating drinking water by adding a primary coagulant and coagulant aid to drinking water to form a mixture, the primary coagulant added in an amount effective to form a floc in the drinking water. The primary coagulant comprises a natural, cationic polymer and the coagulant aid comprises an effective amount of a clay mineral. The floc containing particles that cause turbidity and color is then separated from the drinking water. In preferred methods, the step of separating comprises separating suspended matter from drinking water by a method selected from the group consisting of gravity settling, filtration and flotation.

Most preferably, the natural, cationic polymer is chitosan or a cationic starch. The coagulant aid is a clay mineral, most preferably bentonite. The primary coagulant and coagulant aid may be added simultaneously or sequentially. After addition, the mixture is agitated with the drinking water. A preferred concentration weight ratio of natural polymer to clay mineral is between 1:5 and 1:20.

Another embodiment is a composition for removing turbidity, particles, and color from drinking water, that includes a natural, cationic polymer coagulant and clay mineral in a total amount effective to form a floc in the drinking water. This includes a weight ratio coagulant/clay mineral of between about 1:5 to about 1:20. Preferably, the polymer coagulant includes chitosan or cationic starch. The clay mineral is preferably bentonite.

The methods and compositions of the invention offer advantages when used for drinking water treatment processes.

DETAILED DESCRIPTION OF THE INVENTION

The invention pertains to combined use of certain natural organic cationic polymers as primary coagulants in combination with clay minerals as coagulant aids to remove particles, color, and turbidity from drinking water. Applicants have made the discovery that the addition of certain natural, organic cationic polymers as primary coagulants in combination with clay minerals as coagulant aids will remove these contaminants from drinking water as well or better than either component alone or than many of the optimal chemical coagulant regimes (typically aluminum sulfate with or without a synthetic polymer) currently in use at most water treatment plants world-wide.

Turbidity in drinking water is caused primarily by inorganic and organic suspended particles whereas the color of drinking water is a qualitative indication of the presence of organic material. Turbidity is a measure of the light-scattering properties of the particulate matter present. Because the light-scattering properties of different kinds of particles vary, turbidity does not give a direct measure of the number of particles present. Although controlling turbidity is one of the most common process control methods in drinking water treatment, particle counters are now being applied to determine by direct measurement the actual number of particles removed by a given treatment. The methods described herein not only remove particles, as detected by either turbidity or particle count, but can be used to remove from drinking water pathogenic microorganisms such as Giardia cysts and Cryptosporidium associated with particles.

Drinking Water Treatment Methods

The objective of drinking water treatment is to produce a water that is biologically and chemically safe for human consumption and which is aesthetically pleasing in terms of odor, appearance and taste. The principal contaminants which may be found in water include: particulate matter; color; hardness; iron and manganese, toxic organics, and water borne pathogens. A combination of chemical and physical processes are typically used to purify potable water, typically consisting of coagulation/flocculation followed by settling, filtration and/or flotation.

Aluminum sulfate $(Al_2(SO_4)_3 * 18H_2O)$ is by far the most frequently used coagulant in drinking water treatment. New "Surface Water Treatment Rules" under the Safe Drinking Water Act will require "enhanced coagulation", i.e., the use of increased dosages of coagulant chemicals. This process is being prescribed in order to increase the removal of organic matter, which in turn will minimize the likelihood of the formation of disinfectant/disinfection by-products. However, higher doses of the conventional metal salts will depress pH, reduce alkalinity and generate large quantities of sludge. Because both polynuclear salts and organic coagulants do not have these negative impacts, they are gaining new prominence.

This should be contrasted to municipal wastewater treatment methods, the primary objective of which is to produce an effluent that can be discharged without causing detrimental environmental impacts and industrial wastewater treatment methods, the primary objective of which is to produce a water which can be reused internally in a closed loop within the facility or a water which can be discharged either to a municipal wastewater treatment plant or to the environment. The major contaminants found in municipal wastewater include suspended solids (TSS), biochemical oxygen demand (BOD), the nutrients phosphorus and nitrogen, metals, and pathogens. The principal contaminants in industrial wastewater include TSS, BOD, heavy metals, toxic organics, fats, oils and grease. Physical, chemical and/or biological treatment unit processes may all be employed, depending on the contaminant(s) which must be removed.

Definitions

Chemical coagulation, the alteration of suspended and colloidal particles so they adhere to each other, is one type of chemical treatment process. Although the terms "cogulation" and "flocculation" are often used loosely and interchangeably, coagulation is, in fact, distinct from flocculation and is defined as the process that causes the neutralization of charges or a reduction of the repulsion forces between particles. The overall electrical charge associated with particles and organic matter in water is usually negative. Consequently, positively charged coagulants are added to neutralize the electrical charge. Flocculation is defined as the aggregation of particles into larger agglomerations called "flocs." The coagulation step is virtually instantaneous, while the flocculation (transport) step requires some time for the flocs to develop. Typically, flocs are developed by bubbling air into the water sample after coagulation to increase buoyancy of the coagulated material and bring the floc to the surface of the sample. Effective coagulation/flocculation can remove particles over a wide range of particle sizes. Particles as small as 1 micron in size can be removed. Filtration improves particle removal over coagulation/flocculation only in the size range from 0.5 to 1.0 micron. Effective coagulation/flocculation can remove most suspended particles, colloidal color, bacteria (0.1–0.2 microns), Giardia cysts (5–15 microns), Cyptosporidium (4–7 microns), and most algae.

The term "effective dose" refers to a dose that is sufficient to produce the desired effect of removing particles, color, and the like.

The term "primary coagulant" refers to the first coagulant (typically a metal salt) added alone or in a sequence.

The term "coagulant aid" refers to a chemical (typically a cationic, synthetic organic polymer) which, when added with a primary coagulant, enhances the adherence of the particles. An anionic or nonionic polymer, generally of a high molecular weight, added after flocculation is initiated, will act as a "flocculant aid" by contributing to the aggregation of the floc.

The term "water" refers to municipal potable or drinking water systems and not municipal sewage or industrial wastewaters.

The term "natural organic polymer" means a naturally occurring (as opposed to man-made) organic, low to medium molecular weight, long-chained molecule of repeating linked units.

Natural organic polymers are preferred to metal salts because: 1. They are effective in very low dosages as compared to metal salts; 2. Low dosages of polymers reduce the volume of sludge produced (because the volume of sludge is partly a function of chemical dose); 3. Their effectiveness is less pH dependent than for metal salts; 4. Polymers improve the sludge dewatering process as compared to alum or iron salts and provide a high sludge density; 5. Polymers are generally more biodegradable than alum or iron salt sludges and therefore ease sludge digestion by microorganisms; 6. They are non-corrosive and easy to handle; 7. Polymers do not pose problems in terms of residual metals contamination. 8. They have only a slight impact on pH and alkalinity.

Natural organic polymers are preferably cationic such as cationic starches, for example, potato starch. Exemplary cationic starches may be substituted to a degree of substitution that will vary upon the circumstances. A relatively high degree of substitution (D.S) includes values greater than about 0.03. Suitable substituents include tertiary and quaternary amine groups. Cationic starches are obtainable from other sources, for example, waxy maize starch, corn starch, wheat starch, and rice starch. See, for example U.S. Pat. No. 5,071,512—(Bixler and Peats), incorporated herein by reference.

The most preferred cationic natural organic polymer is chitosan because it is an abundant and renewable resource, is biodegradable, and has been shown to stimulate plant growth (Brzeski, M. 1987, Chitin and Chitosan—Putting Waste to Good Use. INFOFISH International). Chitosan is non-petroleum-based and is non-toxic.

Chitosan is a modified form of chitin, the second most abundant natural polymer after cellulose. Typically derived from the chitin found in the organic exoskeleta of crustacea such as crabs, shrimps, prawns and lobsters, but also available from fungi and elsewhere, chitosan is a positively-charged polysaccharide, composed of poly-N-acetyl-glucoamine units, linked by beta 1–4 bonds into a linear polymer. It is a linear polyamine whose amino groups are readily available for chemical reaction and salt formation with acids. It has a high charge density of one charge per glucosamine unit. The positive charge of chitosan interacts strongly with the negative charges typical in most natural waters. The most available source of chitin is the shells of crustaceans.

Natural chitin is bound by protein and calcium carbonate which can be removed by various techniques. See, for example, the work by Peniston and Johnson in U.S. Pat. Nos. 3,533,940, 3,862,122 and 3,922,260, and 4,195,175, incorporated herein by reference. Typically, extraction begins with removal of proteins, followed by removal of mineral components with dilute hydrochloric acid. Removal of acetyl groups at an elevated temperature (about 130–150 degrees C.) readily forms chitosan. Chitosan (molecular weight about $10^6$) is virtually insoluble in water and solubility is pH-dependent. Typically, solutions of chitosan are prepared in acetic acid, although other organic acids such as formic, adipic, malic, propionic or succinic acids are suitable.

Exemplary coagulation aids are clay minerals, which may exhibit both a cation exchange capacity and an anion exchange capacity but with a net negative surface charge relative to the surrounding solution. Electrostatic forces or ion exchange are the primary mechanisms by which polymers become attached to clay particles, which is then followed by bridging between particles. See, for example, Wesner, and Gulp, Handbook of Public Water Systems, New York: Van Nostrand Reinhold Co. 1986., incorporated herein by reference.

Clays are hydrated aluminosilicates of calcium, sodium, magnesium and iron. and have not previously been used as coagulant aids in drinking water treatment. The most preferred clay is bentonite, a fine-grained inorganic clay of the mineral montmorillonite that assists in increasing the rate and efficiency of natural polymer coagulation. Three-layer clays like bentonite exhibit the highest cation exchange capacity relative to other clays. The term "bentonite" includes forms such as commercial bentonites, Western bentonite, Wyoming bentonite, Fullers Earth). Bentonite and bentonite-type clays have been further defined as anionic clays such as sepiolite, nontronite, hectorite, saponite, volkonskite, sauconite, beidellite, allevarlite, illite, halloysite, and attapulgite (U.S. Pat. Nos. 4,749,444 and 4,753,710, incorporated herein by reference). Bentonites have a negative charge and can add weight to the flocs, joining them together to produce larger, tougher, and faster settling flocs.

Methods of the invention include adding the natural polymer as the primary coagulant and the clay as the coagulant aid, either simultaneously or sequentially, to a drinking water sample. It is most preferred that the mixture be agitated to enhance binding of pollutants to the natural cationic polymer and clay.

Knowledge of the appropriate mixture of natural cationic polymer and clay for one type of drinking water system cannot be used to predict the appropriate mixture for another drinking water system. The principal factors affecting coagulation include the type of coagulant, dosage of coagulant, mixing time and speed, order of coagulant addition, pH and alkalinity, temperature, properties of the natural organic matter in the raw drinking water (e.g. hydrophilic vs. hydrophobic, specific UV absorbance), and the like. Thus, the exact proportions of the ingredients used in the present methods must be determined de novo for each water treatment site. Generally, we have found that a weight ratio of coagulant to coagulant aid works best with a ratio of 1:5 to about 1:20. A general means for determining the appropriate proportions entail the use of the standard jar test procedure as described in Hudson, H. E. Jr. Water Clarification Processes/Practical Design and Evaluation. New York: Van Nostrand Reinhold Co. 1982, incorporated herein by reference.

The methods discussed herein have been shown to markedly enhance the removal of particles, organic matter that forms color, and turbidity from drinking water. Significantly, low doses of the natural polymer chitosan and the coagulant aid bentonite are able to perform as well, or better, than alum alone or alum with a synthetic polymer in the removal of particulate matter and color from drinking water. The preferred chitosan dose is between 0.5 to 1.0 mg/l and the preferred bentonite dose is between 5 and 10 mg/l. In the range of effective doses, alum reduced pH by 1.0 to 1.4 units, but chitosan plus bentonite lowered pH only by 0.1 to 0.2 units. Water treated with chitosan/bentonite will require less subsequent chemical treatment to neutralize the water. Alkalinity testing indicated that, in the range of optimal doses, alkalinity is reduced by 12% to 15% with chitosan plus bentonite and by over 50% to 64 % with alum.

The invention will now be illustrated by the following, non-limiting examples.

EXAMPLE 1

Treatment with Chitosan/Bentonite

This Example illustrates experiments using the method of the invention performed on two Massachusetts municipal drinking water facilities.

A. Description of the Water Systems—Fresh Pond and Wachusett Reservoir

Fresh Pond, the terminal drinking water supply reservoir of the Cambridge Water Department (CWD) in Cambridge, Mass. and Wachusett Reservoir, a principal municipal water supply reservoir in the Massachusetts Water Resources Authority (MWRA) system in Clinton, Mass. were selected for detailed testing comparisons of alum and chitosan not simply because they are convenient local drinking water sources, but because each system faces difficult water treatment challenges in the near future.

CWD—Fresh Pond

CWD uses aluminum sulfate as the primary coagulant in a multiple-stage, 14 million gallons per day (mgd) water treatment plant which is comprised of rapid mix, flocculation, clarification, and sand filtration units. For three decades, the resulting alum-based sludge has been discharged into Fresh Pond, which is also the City of Cambridge's terminal supply reservoir. This is not a long-term solids disposal option because Fresh Pond is filling up with sludge.

MWRA—Wachusett Reservoir

Wachusett Reservoir, built in 1898, is the water supply system which provides the greater Boston area with over 300 million gallons of water per day.

B. Raw Water Characteristics

During the winter/spring test period, the average raw water characteristics of Fresh Pond and Wachusett Reservoir were as shown in Table 1:

TABLE 1

AVERAGE RAW WATER CHARACTERISTICS

|  | Fresh Pond | Wachusett Reservoir |
|---|---|---|
| Turbidity (NTU) | 1.5 | 0.53 |
| Apparent Color (CU) | 22 | 14 |
| pH | 7.4 | 6.8 |
| Alkalinity (as CaCO3) | 26 | 4.2 |
| Temperature (degrees C.) | 8* | 3 |

*Temperature at time of sampling. Fresh pond samples were not tested on site. Average temperature at time of jar tests was 18 degrees C.

Additional information on Wachusett Reservoir raw water characteristics is found in Table 2 and is taken from Edzward, J., Renckhow, D., and Paralkar, A. 1991. *Analysis and Characterization of Organic Matter in the Water Supplies.* Technical Memorandum. MWRA Pilot Treatment Program/Safe Drinking Water Act Compliance Plan, Subtask 1.2.2, Boston, Mass. October, 1991.

TABLE 2

ADDITIONAL DATA ON WACHUSETT RESERVOIR RAW WATER

|  | Wachusett Reservoir |
|---|---|
| Total Organic Carbon (TOC) (mg/l) | 3.1 |
| Dissolved Organic Carbon (DOC) (mg/l) | 3.0 |
| UV Absorbance (254 nm) (cm$^{-1}$) | .70 |
| Trihalomethane Formation Potential (THMFP) (ug/l) | 155 |

In common with other chemical coagulants, the performance of chitosan can be evaluated through jar tests, an important tool for determining the efficacy of coagulation.

The purpose of the jar tests described below was to determine the effectiveness of chitosan alone and in combination with coagulation aids as an alternate coagulant to alum or ferric chloride in terms of dose, mixing time and speed, order of chemical addition, and temperature.

A standard Phipps & Bird jar test apparatus with six rectangular 2-liter jars was used. Turbidity was analyzed using a HACH Model 2100P portable turbidimeter according to EPA Method 180.1 (nephelometric). Apparent color was analyzed using a Hach Model DR/2000 spectrophotometer on unfiltered samples, according to the Platinum-Cobalt method (HACH Method 8025). This procedure assigns the wavelength of 455 nm as the dominant wavelength. pH was analyzed using a Hach One pH Meter. Alkalinity (as CaCO3) was determined using a HACH Digital Titrator.

Twenty-five jar test series were conducted during November and December, 1992, on water sampled from the headworks to the Cambridge Water Department Treatment Plant. At Wachusett Reservoir, over thirty jar test series were conducted during the months of February, March, and April, 1993, on water sampled from the aqueduct beneath the Wachusett Administration Building (Power House).

C. Procedure

1. Solution Makeup—A 1% chitosan solution was prepared by adding 2 grams (dry basis) of chitosan to 100 ml of water, then adding 100 ml of 2 % acetic acid solution and mixing until completely dissolved. Chitosan was obtained from Protan Inc. of Raymond, Wash.

2. Mixing Regime—Two basic mixing regimes were established:

AWWA Standard Mixing Procedure

The standard Americal Water Works Association (AWWA) jar test procedure is as follows (AWWA, 1978, Simplified Procedures for Water Examination. AWWA Manual M12. AWWA: Denver, Colo.): Six jars are filled with raw water and alum or another primary coagulant is added to each jar in a range of appropriate concentrations. The solution is mixed rapidly for 2 minutes at 150 rpm, then stirred slowly for 30 minutes at 25 rpm. After 30 minutes of settling, a sample from each jar and also a raw water sample is decanted for analysis.

Modified Mixing Procedure

According to some studies, energy input during the rapid mixing stage should be higher with organic polymers when tested as primary coagulants than with metal salts (Fettig, J. et. al., Synthetic Organic Polymers as Primary Coagulants in Wastewater Treatment, *Water Supply,* Vol. 8. Jonkoping, 1990). The modified mixing procedure is as follows: Each of the 6 jars are filled with raw water. Bentonite and chitosan are added simultaneously or sequentially and mixed at 150 rpm for 4 minutes. Mixing speed is reduced to 50 rpm for 30 minutes. The mixer is turned off and flocs are allowed to settle for 30 minutes. Experiments were also conducted at various other mixing times and speeds in order to determine the optimal conditions.

3. Sampling

Raw water was sampled at the headworks to the Cambridge Water Department Plan. The sample was an 80:20 blend of Fresh Pond and Stony Brook Reservoir water, the blend typically used by the City of Cambridge. Fresh samples were collected in the morning of each test day in 5 gallon plastic buckets and transported to the laboratory. At Wachusett Reservoir, water was sampled in 5 gallon plastic buckets from the aqueduct beneath the Wachusett Administration Building (Power House). Tests were performed in a laboratory set up on site.

D. Results—Cambridge Water Department, Fresh Pond

Chitosan/Bentonite Optimal Dose

Chitosan alone performed poorly in terms of turbidity and color removal. However, in combination with bentonite (obtained from American Colloid Company, 1500 W. Shure Drive, Arlington Hts, Ill. 60004-7803 708:392–4600, tradename "Acco Floc 350"), chitosan showed markedly improved results.

The initial experiments tested chitosan in a range between 0 and 2.0 mg/l in increments of 0.1 mg/l. The optimal concentration of chitosan was 0.5 mg/l for Fresh Pond water. Bentonite was evaluated in a range between 0 to 20 mg/l in increments of 1 mg/l. Both turbidity and color were best removed with a bentonite concentration of 9 mg/l; a range between 6 and 9 mg/l would be effective. (See FIGS. 1–4). Bentonite alone did not act as a coagulant and turbidity and color increased when bentonite was tested by itself. Bentonite did not improve the performance of alum. That bentonite acts as a coagulant aid rather than as a coagulant is evidenced by the fact that turbidity and color increased in drinking water rather than decreased when bentonite was tested by itself.

Comparison of Alum versus Chitosan/Bentonite

Figure 1:
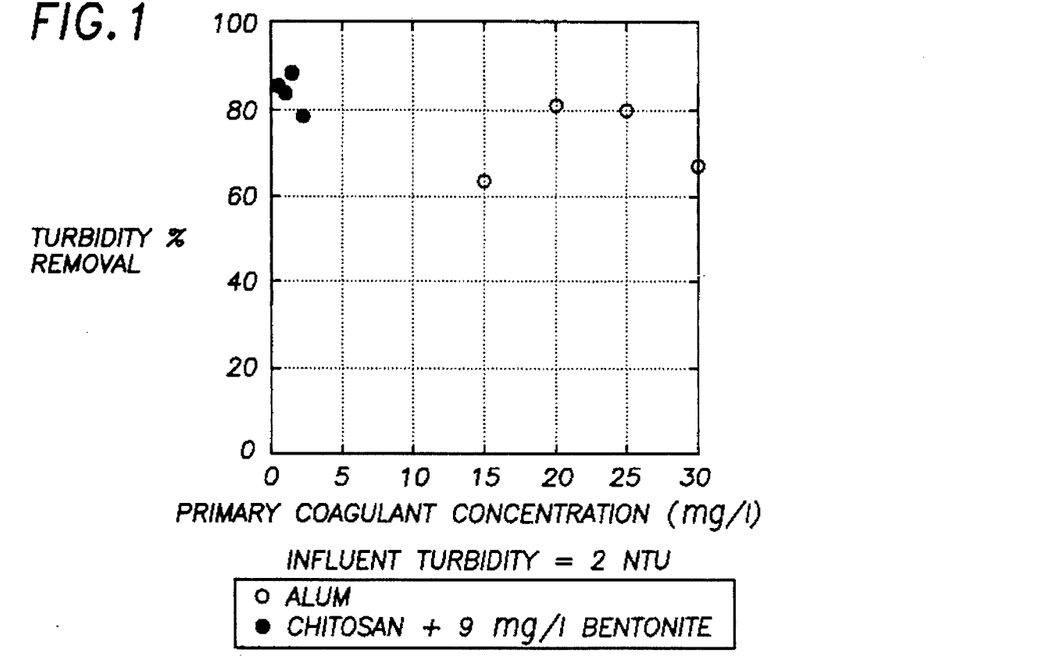
FIG. 1 is a graph comparing percentage removal of turbidity from water taken from Fresh Pond in Cambridge, Mass. using various concentrations of alum (open circles) and chitosan/bentonite (closed circles).
Figure 2:
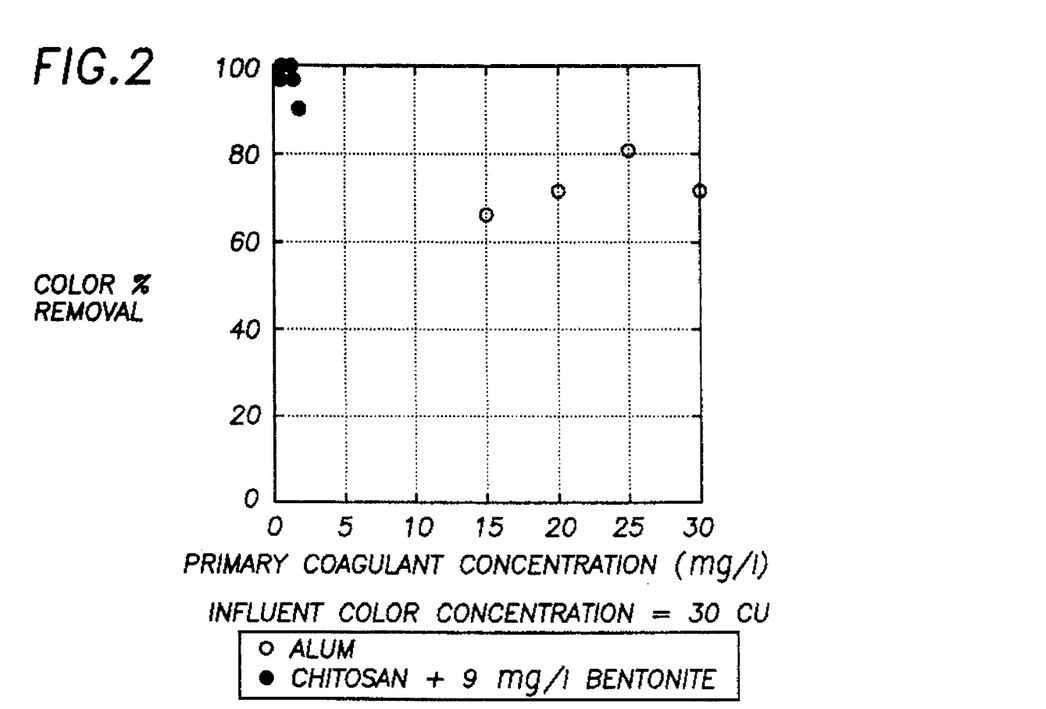
FIG. 2 is a graph comparing percentage removal of color from Fresh Pond water using various concentrations of alum (open circles) and chitosan/bentonite (closed circles)
Figure 3:
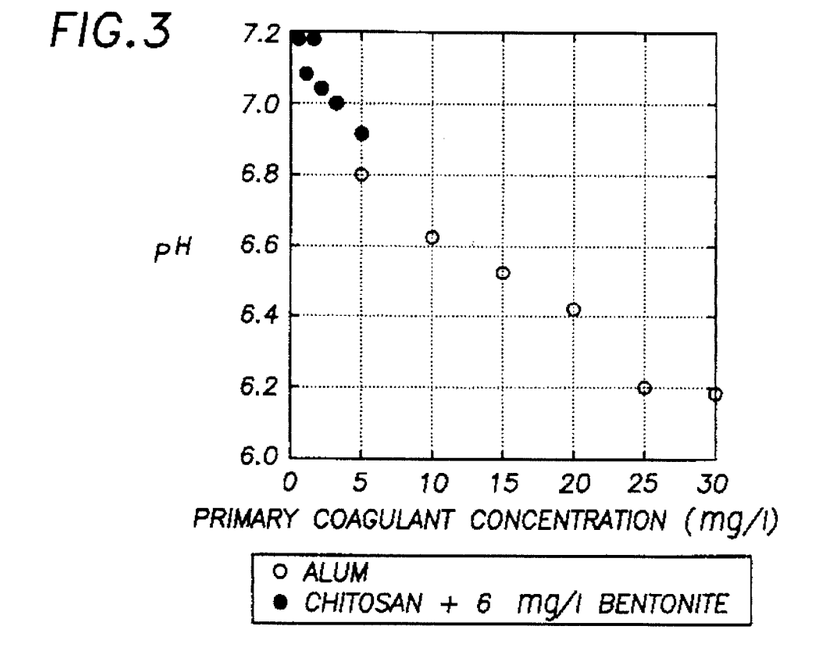
FIG. 3 is a graph comparing hydrogen ion concentration (pH units) in Fresh Pond water after treatment with various concentrations of with alum (open circles) and chitosan/bentonite (closed circles).

Alum was found to perform best when tested with the AWWA standard mixing procedure. Chitosan/bentonite was found to perform best when tested with the modified mixing procedure. FIGS. 1 and 2 compare alum to chitosan/bentonite based on their respective optimal mixing procedures. These figures illustrate the best results obtained on the same day on the same water sample with the mixing procedure selected to show the given chemical to its best advantage.

With 0.5 mg/l chitosan plus 9 mg/l bentonite, turbidity % removal was slightly improved (FIG. 1) and color % removal (FIG. 2) was significantly improved compared to using 20 to 25 mg/l alum.

pH was depressed only slightly relative to the raw water sample when chitosan/bentonite was the coagulant mixture—by 0.1 to 0.2 (FIG. 3). pH reduction was significant with alum addition, decreasing by 1.0 unit relative to the raw water sample.

Figure 4:
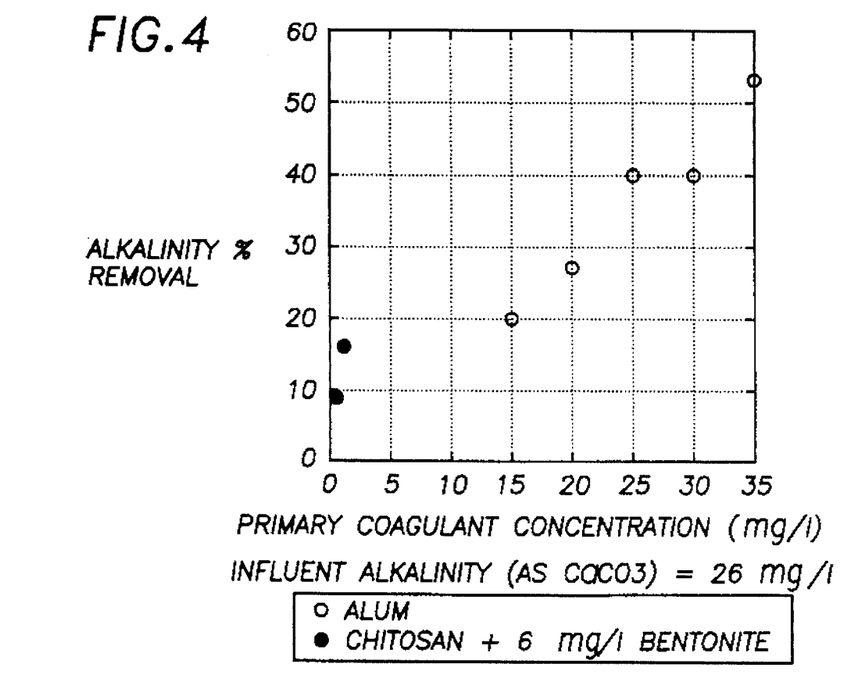
FIG. 4 is a graph comparing percentage removal of alkalinity from Fresh Pond water using various concentrations of alum (open circles) and chitosan/bentonite (closed circles).

Alkalinity decreased by 15 % from 26 to 22 mg/l (as CaCO3) over the range of effective chitosan/bentonite concentrations. Alkalinity decreased by more than 50% from 26 to 12 mg/l (as $CaCO_3$) over the range of effective alum concentrations (FIG. 4).

Other Metal Salts and Polymers Tested

Two other metal salts, ferric chloride ($FeCl_3$) and polyaluminum silica sulfate (PASS), a polymerized metal salt, were evaluated. Both chemicals performed comparably to alum at similar concentrations.

Chitosan as a Coagulant Aid

Chitosan was tested as a coagulant aid. Alum was used as the primary coagulant at 20 mg/l and chitosan was added as a coagulant aid in concentrations ranging from 0.2 to 2 mg/l. These tests did not show any advantage to using chitosan as a coagulant aid in Fresh Pond water.

E. Results—Wachusett Reservoir Water

Chitosan/Bentonite Optimal Dose

Optimal dose was determined on the basis of turbidity and color concentration and percentage removal. In terms of these parameters, chitosan, in combination with the clay product bentonite, showed the best results. Chitosan was tested in a concentration range from 0.2 to 3.0 mg/l. The most effective chitosan concentration range was from 0.5 to 1.5 mg/l; the recommended chitosan concentration for Wachusett Reservoir is 1.0 mg/l. Bentonite was tested in a concentration range from 2 to 40 mg/l. The most effective bentonite concentration range was from 5 to 12 mg/l; the recommended bentonite concentration for Wachusett Reservoir is 8 mg/l. (See FIGS. 5–9).

Alum with and without Synthetic Polymer—Optimal Dose

The optimal dose of alum as a primary coagulant ranged from 5 mg/l to 20 mg/l. Several synthetic cationic organic polymers, Magnifloc #573C and #587C, were tested as coagulant aids in conjunction with alum. Magnifloc #573C (American Cyanamid) is a cationic polyamine and Magnifloc #587C (American Cyanamid) is a cationic polyacrylamide.

At an optimal polymer dose of 2 mg/l, the synthetic cationic polymers tested were inconsistent in enhancing turbidity removal and usually provided no improvement in color removal. Although these polymers may have been successfully used as filtration aids, they were generally ineffective in improving coagulation of Wachusett Reservoir water under winter conditions. Bentonite did not improve the performance of alum at any dose.

Comparison of Alum versus Chitosan/Bentonite

Optimal chemical type and concentration tests were performed on a weekly basis throughout the 3-month test period. For the turbidity removal tests, the average concentration of chitosan/bentonite was 0.9/8 mg/l, that of alum was 11 mg/l, and that of alum/synthetic polymer was 15/2 mg/l. Chitosan/bentonite (49% turbidity removal) outperformed the other two coagulants and coagulant aids (21 percent and 25 percent, respectively). Thus, about 1.0 mg/l chitosan and 8 mg/l bentonite gave significantly better turbidity removal compared to the metal regimes. Overall, chitosan with bentonite gave the best coagulation performance.

Other chemicals were tested and compared to chitosan/bentonite or alum. These chemicals included ferric chloride, a variety of chitosan products, a variety of clay products, and some synthetic organic polymer coagulants, including Dadmac, polyacrylamides, and polyamines.

Figure 5:
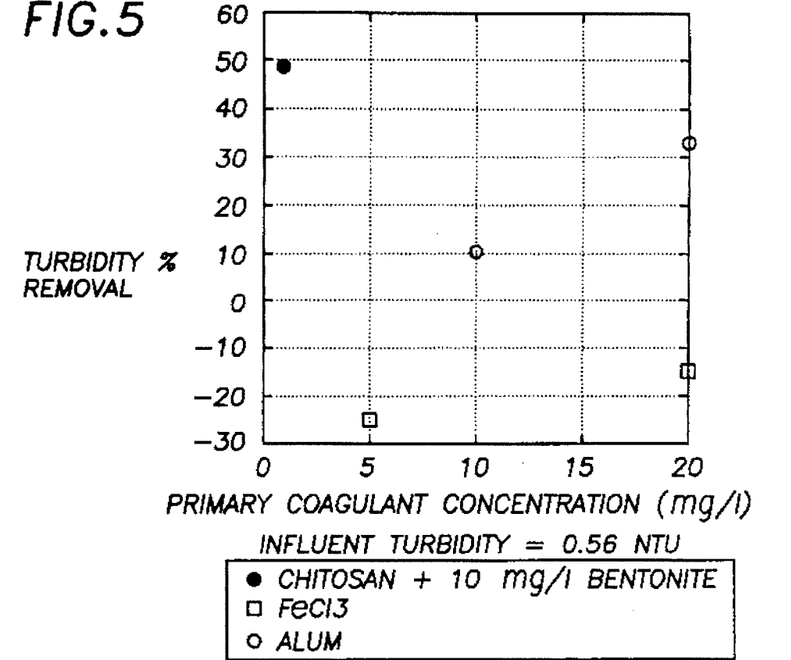
FIG. 5 are representative results showing the effect of various concentrations of primary coagulants (chitosan/bentonite- closed circle; ferric chloride- open square; and alum- open circle) on percentage removal of turbidity from water taken from Wachusett Reservoir in Clinton, Mass.
Figure 6:
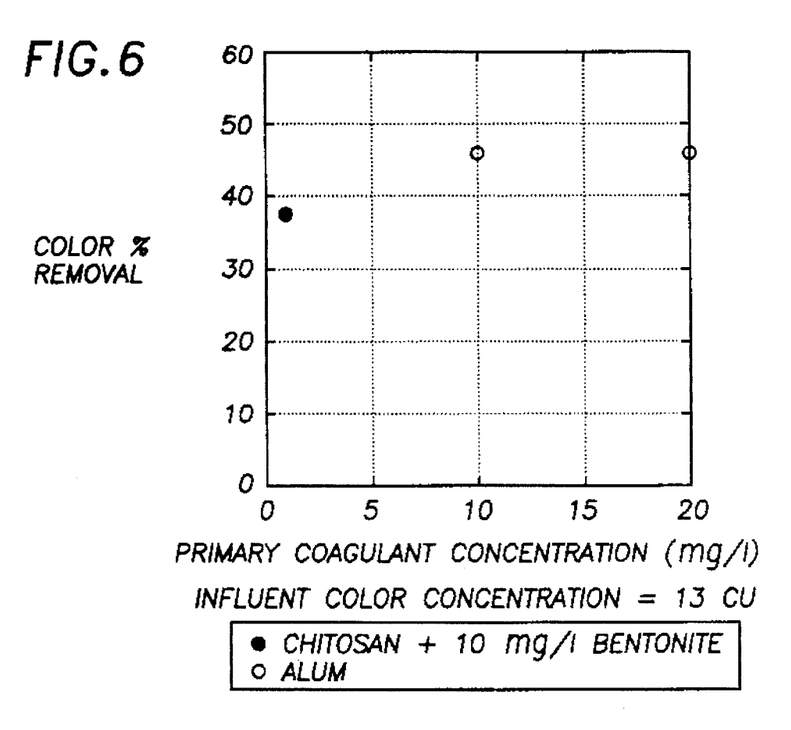
FIG. 6 are representative results showing the effect of various concentrations of primary coagulants (chitosan/bentonite—closed circle; alum—open circle) on percentage removal of color from Wachusett Reservoir water.

FIGS. 5 and 6 are representative results showing the 3 primary coagulants tested versus % removal of turbidity and color, respectively. The poor performance of $FeCl_3$ in FIG. 5 may be due to the winter water temperatures.

Effect of the Mixing Regime

The primary coagulant tests presented in FIGS. 5 and 6 were all performed at the standard AWWA mixing procedure. Chitosan with bentonite performed better than the metal salts according to the mixing procedure developed for metal salts. Other tests indicated that the modified mixing procedure did not improve alum's performance. However, slight increases in rapid mixing time improved turbidity and color removal for the chitosan/bentonite combination (data not shown). Overall, the mixing time and speed tests showed that coagulation efficiency of chitosan with bentonite benefits from slight modifications of the standard mixing procedure.

pH and Alkalinity

Figure 7:
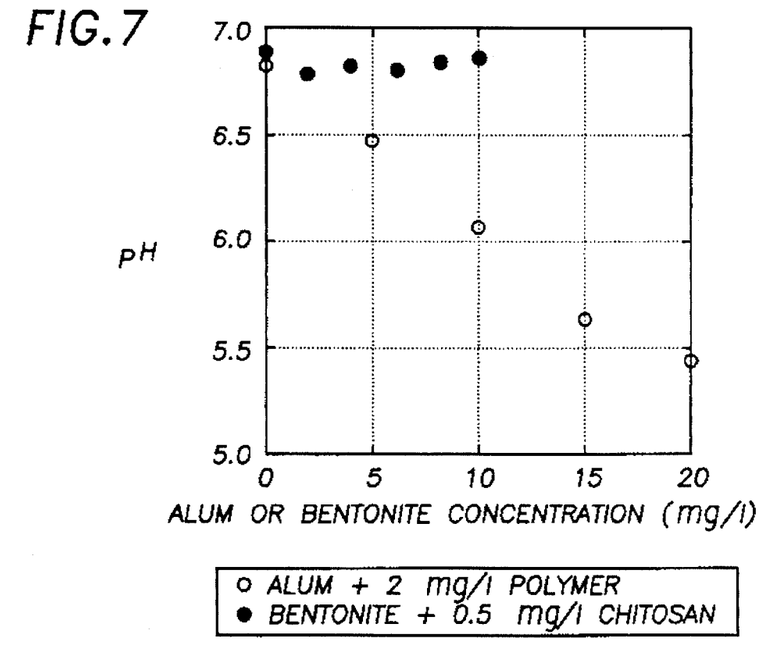
FIG. 7 is a graph showing the effect of various amounts of alum and chitosan/bentonite on hydrogen ion concentration (pH units) of Wachusett Reservoir water.
Figure 8:
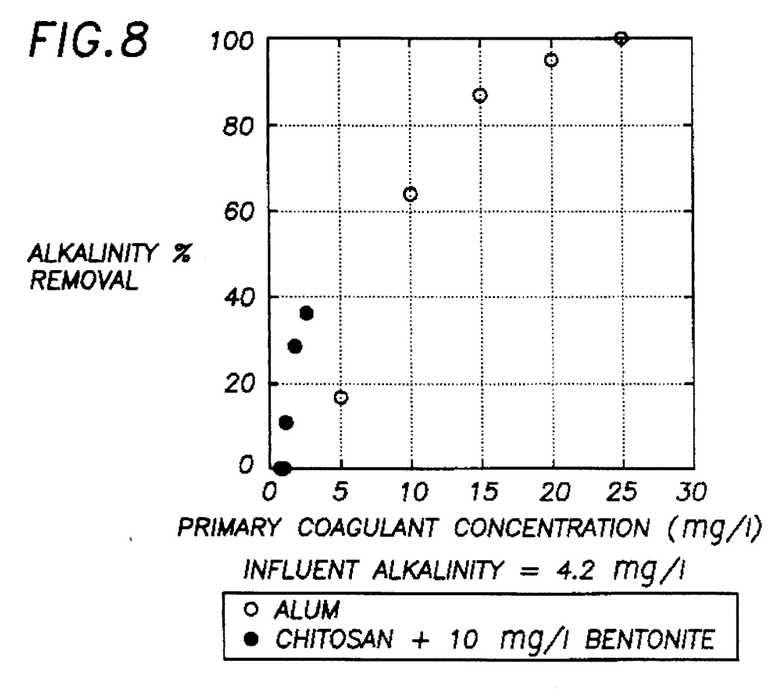
FIG. 8 is a graph comparing percentage removal of alkalinity from Wachusett Reservoir water using various concentrations of alum (open circles) and chitosan/bentonite (closed circles).

In contrast to metal salts, chitosan with bentonite does not decrease pH. FIG. 7 shows that treatment with alum with polymer significantly decreased pH by 1.4 units from 6.8 to 5.4 over the range of effective coagulation concentrations. In contrast, treatment with chitosan/bentonite decreased pH by only 0.1 units from 6.9 to 6.8 over the range of effective bentonite concentrations.

Alkalinity declined sharply with the increased addition of alum. At the effective alum dose of 10 mg/l, the raw water alkalinity concentration of 4.2 mg/l dropped 64 % to 1.5 mg/l. In contrast, alkalinity dropped by only 12% at the effective chitosan dose of 1.0 mg/l with 10 mg/l bentonite (See FIG. 8).

Temperature

Turbidity removal using alum was poor at low water temperatures of 3 degrees Centigrade, the typical water temperature throughout the winter testing season. In contrast, both alum and chitosan/bentonite successfully removed color from drinking water at these low water temperatures.

EXAMPLE 2

Treatment with Chitosan/Bentonite or Cationic Starch/Bentonite

This Example illustrates experiments using the method of the invention at an Illinois water purification plant in 1994.

A. Description of the Chicago South Water Purification Plant (SWPP)

The SWPP is one of the world's largest drinking water treatment plants, with an average daily flow of 418 mgd and a maximum flow of 850 mgd. It is a conventional water treatment plant using horizontal shaft flocculators, conventional sedimentation and granular filtration. The filter waste washwater is settled and the decant is periodically recycled back to the raw water inflow. Sludge is discharged to the sewerage system.

The City of Chicago pumps raw water from Lake Michigan using two intakes. The crib intake is located about two miles off shore and connected to the plant header by a pipeline. The second intake is located directly on the lake shore and consists of a basin with gates allowing raw water intake. The use of shore water is dependent on demand. Demand greater than the capacity of the crib pipeline (approximately 500 mgd) necessitates the use of shore water. During May and June, 1994, bench-scale studies were performed at the SWPP to evaluate the natural polymers chitosan and starch as primary coagulants, with bentonite as a coagulant aid.

Parameters Investigated

The parameters investigated included: temperature, pH, turbidity, and particle count. Turbidity was measured using a Hach 2100P portable turbidimeter. Particle count was measured using a Met One Model 250 A (Grants Pass, Oreg.) particle counter. The reader is directed to *Operational Control of Coagulation and Filtration Processes* (AWWA, 1992, incorporated herein by reference) for a detailed description of this technique.

Raw water: Taps in the SWPP laboratory provide samples from many different points in the treatment system. Shore water contained sufficient turbidity (1.1–4.3 NTU) to be able to show effects of bench-scale coagulation and filtration.

TABLE 3

| | Raw Water Turbidities | |
| --- | --- | --- |
| | Range Turbidity NTU (MIT) | Average Turbidity NTU (MIT) |
| Crib | 0.6–1.2 | 0.9 |
| Shore | 1.1–4.3 | 2.5 |
| Header | 9.7–9.9 | 9.8 |

Turbidity throughout the system, according to several different measures, is given in Table 4:

TABLE 4

| | Turbidity at SWPP | | |
| --- | --- | --- | --- |
| | May 31–June 4, '94 (assayed by SWPP) | May 31–June 4, '94 (present work) | 1993 Annual Average (assayed by SWPP) |
| Crib | 0.5 | 0.8 | 3.8 |
| Shore | 1.1 | 2.5 | 7.1 |
| Header | 1.3 | 9.8 | 4.6 |
| Settling Basin #3 Effluent | 0.8 | 1.0 | |
| Clearwell #3 | 0.11 | 0.15 | |
| 79th St. Outlet | 0.11 | | 0.14 |

Table 4 gives an overview of turbidity in the entire system and shows the variability in some of the measures. (It should be noted that SWPP measures turbidity at many other points in the system. The points presented in Table 4 were selected to give a representative snapshot of the system). Header water shows the greatest fluctuation in turbidities, due to periods throughout the day when settled filter waste washwater is recycled to the raw water header. Clear-well and outlet water is typically about 0.10 to 0.15 NTU.

Jar Tests

A standard Phipps & Bird jar test apparatus with six rectangular 2-liter jars was used throughout the Illinois study.

1. Two liters of raw water are added to each jar.
2. The prescribed dose of coagulant is added to each jar while mixing at a speed of 110 rpm for 1 minute.
3. If a coagulant aid is considered, it is added during the last 15 seconds of the rapid mix stage.
4. The water is flocculated according to the following scheme:
   80 rpm for 7.5 minutes;
   50 rpm for 7.5 minutes;
   35 rpm for 5 minutes.
5. The water is allowed to settle for 20 minutes (0 rpm).
6. For settled water testing, 250 ml is decanted for turbidity analysis ("settled water turbidities"); 500 ml is decanted for particle count analysis.
7. For filtered water testing, 70 ml of the 250 ml sample of settled water is used for the turbidity filterability test. For particle count analysis, an additional 500 ml is decanted for the filterability test.

Filtration Tests

For turbidity analysis, 250 ml of settled water was decanted. Twenty ml of this sample was used to wash the filter, then 50 ml was vacuum filtered (with a Fisher pump and Millipore glassware) though 1.0 micron glass filters (Gelman Science Product #61631). Whatman #1 filters (11 micron nominal size) were also tested for comparative purposes. The 1 micron filters used in the MIT study gave conservative data in comparison with actual full-scale filter performance.

Particle Count

Many contaminants of concern to the water industry are either particles or associated with particles. While particle measurement has traditionally been taken by the indirect means of turbidity or suspended solids concentration, particle count provides a direct measure of the number of particles.

A Met One (Grants Pass, Oreg.) particle counter at the SWPP was used. The reader is directed to "Operational Control of Coagulation and Filtration Processes" (AWWA, 1992, incorporated herein by reference) for a detailed description of this technique. Use of a Met One Model 250 particle counter began at SWPP in October 1993 to improve process control. A 250 ml sample is placed in a beaker inside the instrument, and 25 ml samples are consecutively withdrawn. Data is reported in terms of numbers of particles. Each count is an average of three 25 ml runs. Particles are counted into six preset size ranges: 2–5, 5–10, 10–15, 15–20, 20–50 and >50 micron size ranges.

Chemicals Used at the SWPP

The City of Chicago uses prechlorination for zebra mussel control. Alum is the primary coagulant in a dose range from 3 to 6 mg/l and the widely used cationic polymer, Dadmac (made by American Cyanamid—trade name "Magnifloc") is employed both as a coagulant aid and as a filtration aid.

Chemicals Tested

The chemicals tested are listed in Table 5:

TABLE 5

May 31–June 4, 1994

| PRODUCT | CHARACTERISTICS | FUNCTION |
| --- | --- | --- |
| Alum | Aluminum sulfate | primary coagulant |
| Dadmac | synthetic cationic polymer | coagulant aid |
| Chitosan | natural cationic polymer | primary coagulant and coagulant aid |
| Bentonite | montmorillonite clay with negative surface charge | coagulant aid |
| Starch | natural cationic polymer | primary coagulant |
| Alginate | natural anionic polymer | flocculant aid |
| Carrageenan | natural anionic polymer | flocculant aid |

RESULTS

Primary Coagulant Evaluation

Turbidity

After initial work allowed the determination of the lowest optimal primary coagulant concentrations, multiple tests were run at that optimum. Three to five tests each were run with the following chemical regimes:

*3 mg/l alum

*3 mg/l alum+0.35 mg/l Dadmac

*0.5 mg/l chitosan+5 mg/l bentonite

Results of these tests are given in Table 6:

TABLE 6

| | Average Results for Different Chemical Regimes | | | |
| --- | --- | --- | --- | --- |
| | Average Settled Turbidity Conc. (NTU) | Average Settled Turbidity % Removal | Average Filtered Turbidity Conc. (NTU) | Average Filtered Turbidity % Removal |
| 3 mg/l alum | 0.8 | 64 | 0.65 | 70 |
| 3 mg/l alum + 0.35 mg/l Dadmac | 1.4 | 46 | 0.66 | 78 |
| 0.5 mg/l chitosan + 5 mg/l bentonite | 1.9 | 20 | 0.66 | 74 |

Although the alum regimes gave considerably better settled water results, all three regimes gave essentially comparable average filtered turbidity concentrations.

The experiments typically tested chitosan in dosages between 0.25 to 1.0 mg/l. The use of bentonite as a coagulant aid improved settleability.

Particle Count

At SWPP, particle count analysis is performed three times per week at eight points in the system. These are grab samples, drawn from the appropriate laboratory tap. The first drawn sample is typically taken from the crib water tap at 8:00 am, and subsequent samples are drawn based on the detention time at each point in the system. The SWPP particle count results for one day, Jun. 3, 1994, are given in Table 7:

TABLE 7

Particle Count of SWPP Treatment System Samples

| | PARTICLE SIZE (microns) | | | | | | |
|---|---|---|---|---|---|---|---|
| | 2–5 | 5–10 | 10–15 | 15–25 | 25–50 | >50 | TOTAL |
| Crib | 2,332 | 325 | 25 | 5 | 2 | 0 | 2,689 |
| Shore | 5,464 | 1,474 | 172 | 57 | 36 | 2 | 7,205 |
| Header | 4,740 | 1,220 | 235 | 69 | 30 | 1 | 6,295 |
| Settling Basin Effluent | 2,781 | 583 | 75 | 15 | 1 | 0 | 3,455 |
| Clearwell #2 | 16 | 5 | 1 | 1 | 0 | 0 | 23 |
| N. Reservoir | 21 | 4 | 1 | 1 | 0 | 0 | 27 |
| S. Reservoir | 62 | 11 | 2 | 1 | 0 | 0 | 76 |
| 73rd St. Outlet | 18 | 5 | 1 | 1 | 0 | 0 | 25 |
| 79th St. Outlet | 11 | 2 | 0 | 0 | 0 | 0 | 13 |
| Distribution | 195 | 31 | 4 | 1 | 0 | 0 | 231 |

Looking at the total particle count results in the last column of Table 7, we see that the number of particles in crib water is less than half that of shore or header water. Settling basin effluent water has a higher particle count than the crib water. This is probably on account of the various chemicals added. Particle count drops significantly after filtration, as evidenced in Clearwell #2, the North and South Reservoirs, and the two outlets. Particle count increases in the distribution system; particles are perhaps contributed by the distribution pipes themselves.

The ten individual bench-scale study samples analyzed by particle count on the same day, Jun. 3, 1994, are presented in Table 8. The best bench-scale test results are about equivalent to the number of particles in the distribution system at the full-scale:

Particle Count of Bench-Scale Study Samples
June 3, 1994

| | # | Settled Water Total Particle Count | # | Filtered Water Total Particle Count |
|---|---|---|---|---|
| Shore | 1 | 6,562 | 2 | 221 |
| 0.75 mg/l chitosan + 0.35 mg/l Dadmac | 3 | 7,191 | 4 | 257 |
| 3 mg/l alum + 0.35 mg/l Dadmac | 5 | 1,304 | 6 | 823 |
| 0.5 mg/l chitosan + 5 mg/l bentonite | 7 | 7,195 | 8 | 163 |
| 5 mg/l starch + 5 mg/l bentonite | 9 | 7,006 | 10 | 251 |

In common with samples #3, #5, #7, and #9, the #1 shore water sample is a "settled water" sample, meaning it was allowed to settle for 20 minutes prior to analysis. The total particle count of 6,562 for this shore sample indicates fewer particles than the full-plant shore sample count (7,205) shown in Table 7. The filtered water shore sample has a particle count of 221. This is a surprisingly low count. Low turbidity readings, however, were also evidenced on filtered shore water samples. Of the four chemical coagulant regimes analyzed as filtered samples, chitosan/bentonite ranked #1 for the lowest filtered water particle count, starch/bentonite and chitosan/Dadmac ranked closely as #2 and #3, and alum/Dadmac trailed the other chemical regimes.

Other Natural Polymer Tests

Three cationic potato starches (designated A, P and N-obtained from AVEBE America, St. Louis, Mo., 217:423–2288) were tested as primary coagulants with bentonite as a coagulant aid. Although all the starches increased settled water turbidity above the raw shore water turbidity of 2.0 NTU, Starch N gave the best filtered water results, as shown in Table 9. This is the same starch on which the particle analysis was run (Table 7, samples #9 and #10):

TABLE 9

Potato Starch and Bentonite Tests
(Raw Shore Water Turbidity = 2.0 NTU)

| | Settled Turbidity NTU | Filtered Turbidity NTU |
|---|---|---|
| 5 mg/l starch A + 5 mg/l bentonite | 2.7 | 0.76 |
| 5 mg/l starch P + 5 mg/l bentonite | 2.7 | 0.81 |
| 5 mg/l starch N + 5 mg/l bentonite | 2.2 | 0.63 | pH

The use of alum in a dose range of 3–6 mg/l at SWPP depresses pH and requires the use of a roughly comparable dose of lime for pH adjustment. Effective doses of three natural cationic polymers: chitosan, and starch had only a very slight effect on pH.

Chitosan as a Coagulant Aid

Chitosan as a coagulant aid with 4 mg/l alum was compared to chitosan as a primary coagulant with bentonite. Results are given in Table 10:

TABLE 10

Chitosan as a Coagulant Aid

| Chemical Regime | Raw Water Turbidity NTU | Settled Turbidity NTU | Filtered Turbidity NTU |
|---|---|---|---|
| 4 mg/l alum + 0.5 mg/l chitosan | 1.1 | 0.65 | 0.61 |
| 0.5 mg/l chitosan + 5 mg/l bentonite | 1.1 | 1.58 | 0.63 |

The filtered water results in Table 10 suggest that chitosan can be just as effective at the low dose of 0.5 mg/l as a primary coagulant, provided it is used in conjunction with the coagulant aid bentonite.

CONCLUSIONS

1. A chitosan/bentonite chemical coagulant regime gave the best filtered water particle count results, followed by a starch/bentonite and a chitosan/Dadmac chemical regime. Alum/Dadmac gave the least successful filtered water particle count results.

2. Alum alone, alum/Dadmac and chitosan/bentonite gave essentially the same filtered water turbidity, based on averages from multiple trials.

3. At an effective dose of 0.5 mg/l, chitosan can be used as a primary coagulant, with bentonite as a coagulant aid, instead of using alum with chitosan as a coagulant aid.

4. A cationic potato starch used as a primary coagulant with bentonite gave good filtered water results, both for turbidity and particle count.

5. pH was reduced from 8.34 to 7.48 in the concentration range from 1 mg/l to 4 mg/l for alum; pH was reduced by 0.04 to 0.07 when chitosan/potato starch was used as the primary coagulant at effective concentrations. Use of these natural polymer primary coagulants allows usee of lower concentrations of pH adjustment chemicals.

Sludge Production

We will assume an alum/polymer recommendation of 10 mg/l and 1.5 mg/l polymer and a chitosan/bentonite recommendation of 1.0 mg/l chitosan and 8 mg/l bentonite for use in a water treatment plant.

A simple equation to evaluate sludge production is given as follows:

$$M_s = 86.4 \, Q(0.44A + SS + M) \quad \text{(Equation 1)}$$

where $M_s$=dry sludge produced (kg/day)

Q=plant flow (m$^3$/sec)=(13.1 m$^3$/sec assumed)

A=alum dose (mg/l)

SS=suspended solids in raw water (mg/l)

M=miscellaneous chemical additions such as polymers, pH neutralizing chemical, bentonite etc. (mg/l)

The insoluble aluminum hydroxide complex $Al(H_2O)_3(OH)_3$ is thought to predominate in most water treatment plant sludges when alum is used. This species results in the production of 0.44 kg of chemical sludge for each kg of alum added. Any suspended solids present in the water will produce an equal amount of sludge. Polymers and clays will produce about one kg of sludge per kg of chemical addition See, Davis, M., and Cornwell, D., "Introduction to Environmental Engineering", 2nd Edition. McGraw-Hill, Inc., New York., 1985. Turbidity, especially in low turbidity waters, makes an insignificant contribution to sludge quantity.

Based on equation 1, 1.0 mg/l chitosan plus 8 mg/l bentonite will produce about the same amount of sludge as 15 mg/l alum plus 1.5 mg/l polymer.

Cost

A rough estimate can be made of the relative costs of using alum and a polymer versus using chitosan and bentonite at Wachusett Reservoir. The following assumptions pertain:

Flow=300 mgd (1.1×10$^9$ l/day=13.1m$^3$/sec)

Alum concentration=10 mg/l

Polymer concentration=1.5 mg/l

Chitosan concentration=1.0 mg/l

Bentonite concentration=8 mg/l

Cost of alum=$0.10/lb ($0.22/kg)

Cost of polymer=$1.70/lb ($3.74/kg)

Cost of chitosan=$3.00/lb ($6.60/kg)

Cost of bentonite=$0.10/lb ($0.22/kg)

Alum+Polymer Cost

Alum 10 mg/L×$0.22/kg×10$^{-6}$ kg/mg×1.1×10$^9$ l/day=$2,400/day

Polymer 1.5 mg/L×$3.74/kg×10$^{-6}$ kg/mg×1.1×10$^9$ l/day=$6,200/day

Chitosan+Bentonite Cost

Chitosan 10 mg/L×$6.60/kg×10$^{-6}$ kg/mg×1.1×10$^9$ l/day=$7,300/day

Bentonite 8 mg/L×$0.22/kg×10$^{-6}$kg/mg×1.1×10$^9$ l/day=$1,900/day

TOTAL=$9,200/day

In terms of the chemical cost alone, the chitosan/bentonite cost is only slightly more expensive than the alum/polymer cost, Besides the chemical cost, the chitosan plus bentonite chemical combination would have other operating cost implications. Because chitosan plus bentonite has only a slight impact on pH, cost savings would occur from reduced demand for neutralizing agents. A significant cost savings from the use of chitosan and bentonite would also be in sludge handling and disposal. The increased options for disposal of a beneficial sludge would outweigh the slight additional chemical cost. Column 2 of Tables 11 and 12 gives total present worth cost estimates for various sludge handling and disposal alternatives for one large drinking water system (e.g., MWRA).

Based on the sludge production estimate of 11,500 lb/day, column 3 of Tables 11 and 12 give the dollar cost per dry ton of sludge. These Tables illustrate the wide range of sludge handling and disposal costs. The better the sludge for land application (less metals, lower toxic organic levels), the greater the likelihood that the lower land application costs of Table 12 could pertain. Chitosan plus bentonite offers a more desirable sludge for land application.

TABLE 11

COST ESTIMATES OF SLUDGE PROCESSING AND LANDFILL

| Option | Total Present Worth ($ million) | Cost ($/dry ton of sludge) |
| --- | --- | --- |
| Freeze/Thaw Lagoons | 17.0 | 405 |
| Plate and Frame | 25.9 | 617 |
| Belt Press + F/T Lagoons | 18.0 | 429 |
| Belt Press + Drying Lagoons | 19.2 | 457 |

TABLE 12

COST ESTIMATES OF SLUDGE PROCESSING & LAND APPLICATION

| Option | Total Present Worth ($ million) | Cost ($/dry ton of sludge) |
| --- | --- | --- |
| Freeze/Thaw Lagoons | 13.3 | 317 |
| Plate and Frame | 19.5 | 463 |
| Belt Press + F/T Lagoons | 14.3 | 341 |
| Belt Press + Drying Lagoons | 12.7 | 302 |
| Belt Press | 10.7 | 254 |

Equivalents

It should be understood that various changes and modifications of the preferred embodiments may be made within the scope of the invention. Thus it is intended that all matter contained in the above description be interpreted in an illustrative and not limited sense.

We claim:

1. A method of treating drinking water containing suspended matter, comprising:

adding a primary coagulant and coagulant aid to drinking water to form a mixture, the primary coagulant added in an amount effective to form a floc including said suspended matter in the drinking water and comprising a natural, cationic polymer selected from the group consisting of chitosan and cationic starch, the coagulant aid comprising an effective amount of a clay mineral, wherein the weight ratio of coagulant:coagulant aid is between about 1:5 to about 1:20; and separating the flocculated suspended matter from the drinking water.

2. The method of claim 1, wherein the step of separating comprises separating suspended matter from drinking water by a method selected from the group consisting of gravity settling, filtration and flotation.

3. The method of claim 1, wherein the suspended matter comprises particles and organic matter that cause the drinking water to have a color.

4. The method of claim 1, wherein the step of adding a natural, cationic polymer comprises adding chitosan.

5. The method of claim 1 or 4, wherein the step of adding a clay mineral comprises adding bentonite.

6. The method of claim 5, wherein the step of adding comprises adding the primary coagulant and coagulant aid simultaneously and agitating the drinking water.

7. The method of claim 5, wherein the step of adding a clay mineral comprises adding about 5 to about 10 mg/l bentonite.

8. The method of claim 4, wherein the step of adding a natural, cationic polymer comprises adding about 0.5 to about 1.0 mg/l chitosan.

9. The method of claim 1, wherein the step of adding a natural, cationic polymer comprises adding cationic starch.

* * * * *